US012626630B2

(12) United States Patent
Lin et al.

(10) Patent No.: US 12,626,630 B2
(45) Date of Patent: May 12, 2026

(54) DISPLAY AND METHOD OF ADJUSTING TONE OF DISPLAY

(71) Applicant: HannStar Display Corporation, Taipei City (TW)

(72) Inventors: Bing-Nan Lin, Taichung City (TW); Cheng-Kuan Hou, Kaohsiung City (TW); Cheng-Yen Yeh, Taipei City (TW); Yu-Cheng Lin, Pingtung County (TW); Hsu-Ho Wu, Tainan City (TW)

(73) Assignee: HannStar Display Corporation, Taipei City (TW)

( * ) Notice: Subject to any disclaimer, the term of this patent is extended or adjusted under 35 U.S.C. 154(b) by 105 days.

(21) Appl. No.: 18/638,712

(22) Filed: Apr. 18, 2024

(65) Prior Publication Data

US 2025/0246112 A1 Jul. 31, 2025

(30) Foreign Application Priority Data

Jan. 26, 2024 (TW) ................................. 113103100

(51) Int. Cl.
$G09G\ 3/20$ (2006.01)
$G09G\ 5/10$ (2006.01)
$H04N\ 5/202$ (2023.01)

(52) U.S. Cl.
CPC ............. $G09G\ 3/2007$ (2013.01); $G09G\ 5/10$ (2013.01); $H04N\ 5/202$ (2013.01); $G09G\ 2320/0242$ (2013.01); $G09G\ 2320/0666$ (2013.01); $G09G\ 2320/0673$ (2013.01); $G09G\ 2354/00$ (2013.01)

(58) Field of Classification Search
None
See application file for complete search history.

(56) References Cited

U.S. PATENT DOCUMENTS

| | | | | |
|---|---|---|---|---|
| 2002/0176024 | A1 | 11/2002 | Kao et al. | |
| 2009/0278854 | A1* | 11/2009 | Wang .................... | G09G 3/3611 |
| | | | | 345/589 |
| 2012/0002133 | A1* | 1/2012 | Yamazaki .............. | G09G 3/342 |
| | | | | 349/149 |
| 2020/0152142 | A1 | 5/2020 | Kim et al. | |
| 2022/0375405 | A1 | 11/2022 | Zhang et al. | |
| 2023/0005408 | A1* | 1/2023 | Lee .......................... | G09G 5/10 |
| 2023/0316978 | A1 | 10/2023 | Park et al. | |

OTHER PUBLICATIONS

"Office Action of Taiwan Counterpart Application", issued on Dec. 4, 2024, p. 1-p. 4.

* cited by examiner

*Primary Examiner* — Joni Hsu
(74) *Attorney, Agent, or Firm* — JCIPRNET

(57) ABSTRACT

Disclosed is a method of adjusting tone of a display, including setting a gamma value range according to an input signal, adjusting a gamma value of each of a plurality of grayscales within a grayscale range so that a plurality of gamma values of the grayscales gradually change within the gamma value range and are different from one another, and adjusting an image signal according to the adjusted gamma values of the grayscales and outputting the adjusted image signal to a display panel. The adjusted gamma values of the grayscales increase or decrease as a grayscale level of each grayscale rises. A display adopting the method of adjusting tone of the display is also provided.

8 Claims, 7 Drawing Sheets

DISPLAY AND METHOD OF ADJUSTING TONE OF DISPLAY

CROSS-REFERENCE TO RELATED APPLICATION

This application claims the priority benefit of Taiwan application serial no. 113103100, filed on Jan. 26, 2024. The entirety of the above-mentioned patent application is hereby incorporated by reference herein and made a part of this specification.

BACKGROUND

Technical Field

The disclosure relates to a display technology, and in particular to a display and a method of adjusting tone of the display.

Description of Related Art

Adjusting the brightness of grayscales is crucial for the display quality of a display. In order to satisfy different display requirements or contexts of use and to optimize display quality, a gamma curve of grayscale brightness against grayscale of the display must be properly adjusted. However, at present, these adjustments cannot be performed by end product manufacturers (e.g., system manufacturers) or consumers. As a result, the image quality of the display cannot be easily optimized as per usage requirements.

SUMMARY

The disclosure provides a method of adjusting tone of a display, which facilitates an adjustment of enhancing or suppressing low grayscales or high grayscales and can satisfy to a more diverse taste in color.

The disclosure provides a display, which facilitates an adjustment of tone of display grayscales and can better satisfy adjustment requirements of a user end.

A method of adjusting tone of a display of the disclosure includes setting a gamma value range according to an input signal, adjusting gamma values of a plurality of grayscales within a grayscale range respectively so that the gamma values of the grayscales gradually change within the gamma value range and are different from one another, and adjusting an image signal according to the adjusted gamma values of the grayscales and outputting the adjusted image signal to a display panel. The adjusted gamma values of the grayscales increase or decrease as a grayscale level of each grayscale rises.

In an embodiment of the disclosure, according to the method of adjusting tone of the display, the adjusted gamma value of each grayscale satisfies a following relational expression: $g=(g2-g1)\cdot(nL)^{g3}+g1$ where g is the adjusted gamma value of each grayscale, g1 is one of a minimum gamma value and a maximum gamma value of the gamma value range, g2 is other one of the minimum gamma value and the maximum gamma value of the gamma value range, nL is a normalized grayscale of each grayscale and is within a range of 0 to 1, and g3 is within a range of 0.5 to 3.

In an embodiment of the disclosure, the method of adjusting tone of the display further includes generating a corresponding adjusted grayscale according to the adjusted gamma value of each grayscale. The adjusted grayscale satisfies a following relational expression: $nL'=nL^{(g/2.2)}$, where nL' is a normalized grayscale of the adjusted grayscale and is within a range of 0 to 1.

In an embodiment of the disclosure, the display of the method of adjusting tone of the display is suitable for displaying a first color and a second color different from each other. A maximum brightness of the first color is different from a maximum brightness of the second color. Setting the gamma value range includes setting a first gamma value range of the gamma value range according to the maximum brightness of the first color and setting a second gamma value range of the gamma value range according to the maximum brightness of the second color. The first gamma value range is different from the second gamma value range. The maximum brightness of the first color is greater than the maximum brightness of the second color, and a maximum gamma value of the first gamma value range is greater than a maximum gamma value of the second gamma value range.

In an embodiment of the disclosure, the input signal of the method of adjusting tone of the display is generated by operating a user interface or an input component of the display.

A display of the disclosure includes a display panel and a control unit. The display panel is suitable for displaying according to an image signal. The control unit is electrically coupled to the display panel and is configured to set a gamma value range according to an input signal, adjust gamma values of a plurality of grayscales within a grayscale range respectively so that the gamma values of the grayscales gradually change within the gamma value range and are different from one another, and adjust an image signal according to the adjusted gamma values of the grayscales and outputting the adjusted image signal to the display panel. The adjusted gamma values of the grayscales increase or decrease as a grayscale level of each grayscale rises.

In an embodiment of the disclosure, the adjusted gamma value of each grayscale of the display satisfies a following relational expression: $g=(g2-g1)\cdot(nL)^{g3}+g1$, where g is the adjusted gamma value of each grayscale, g1 is one of a minimum gamma value and a maximum gamma value of the gamma value range, g2 is other one of the minimum gamma value and the maximum gamma value of the gamma value range, nL is a normalized grayscale of each grayscale and is within a range of 0 to 1, and g3 is within a range of 0.5 to 3.

In an embodiment of the disclosure, the control unit of the display is further configured to generate a corresponding adjusted grayscale according to the adjusted gamma value of each grayscale. The adjusted grayscale satisfies a following relational expression: $nL'=nL^{(g/2.2)}$, where nL' is a normalized grayscale of the adjusted grayscale and is within a range of 0 to 1.

In an embodiment of the disclosure, the display is suitable for displaying a first color and a second color different from each other. A maximum brightness of the first color is different from a maximum brightness of the second color. Setting the gamma value range includes setting a first gamma value range of the gamma value range according to the maximum brightness of the first color and setting a second gamma value range of the gamma value range according to the maximum brightness of the second color. The first gamma value range is different from the second gamma value range. The maximum brightness of the first color is greater than the maximum brightness of the second color, and a maximum gamma value of the first gamma value range is greater than a maximum gamma value of the second gamma value range.

In an embodiment of the disclosure, the input signal of the display is generated by operating a user interface or an input component of the display.

Based on the above, in the display and the method of adjusting tone thereof according to the embodiments of the disclosure, the control unit is suitable for adjusting the gamma values of the grayscales within the grayscale range respectively so that the grayscales have the gamma values that gradually change and are different from one another within the set gamma value range. By adjusting the image signal to be output to the display panel according to the distribution of the adjusted gamma values of the grayscales, brightness enhancement or suppression of low grayscales or high grayscales can be implemented, thereby satisfying the adjustment requirements of different tastes in images.

DESCRIPTION OF THE EMBODIMENTS

Figure 1:
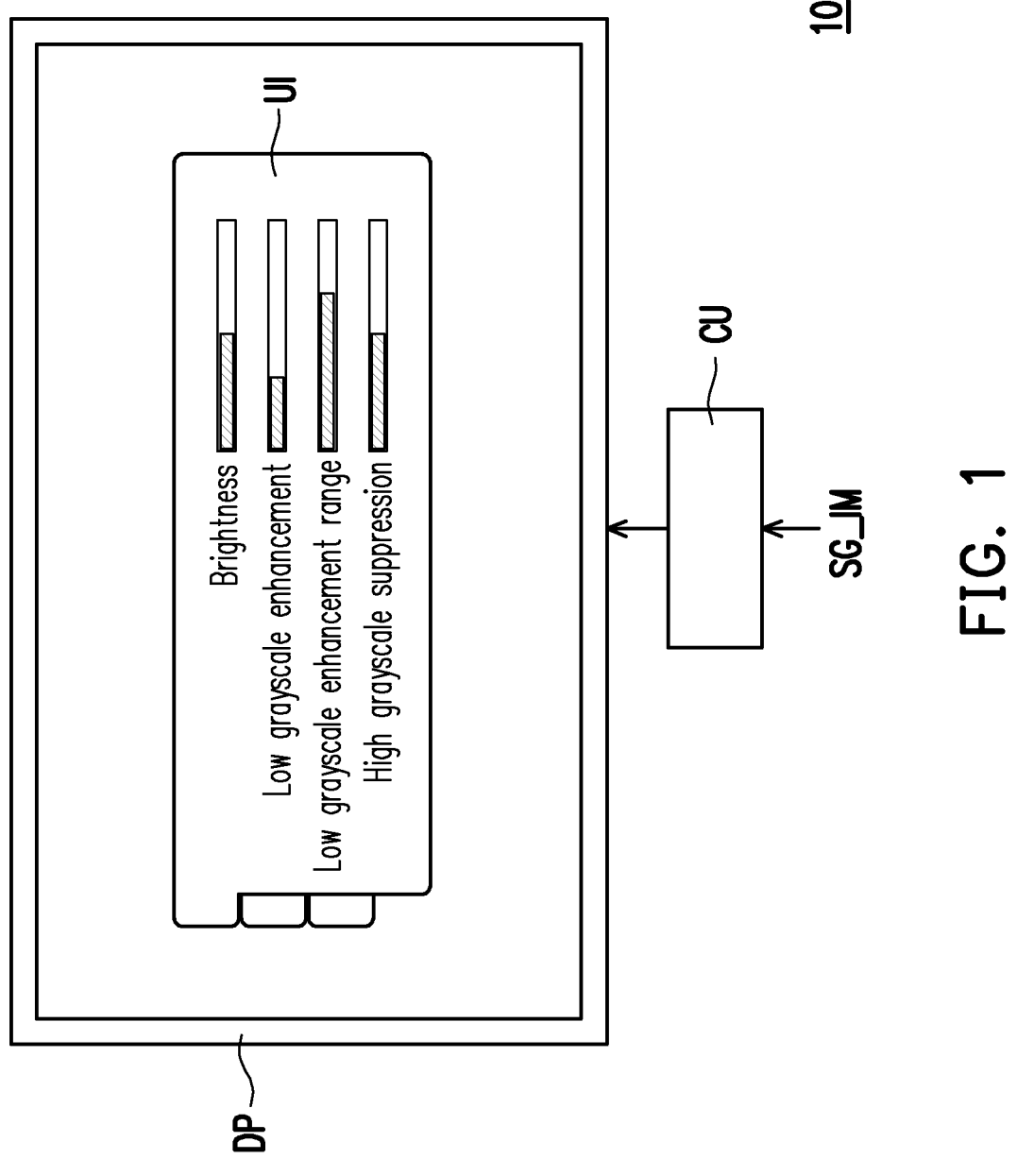
FIG. 1 is a schematic diagram of a display according to an embodiment of the disclosure.

Reference will now be made in detail to the exemplary embodiments of the disclosure, examples of the exemplary embodiments are illustrated in the drawings. Wherever possible, the same reference numerals are used in the drawings and the description to refer to the same or similar parts.

Figure 2:
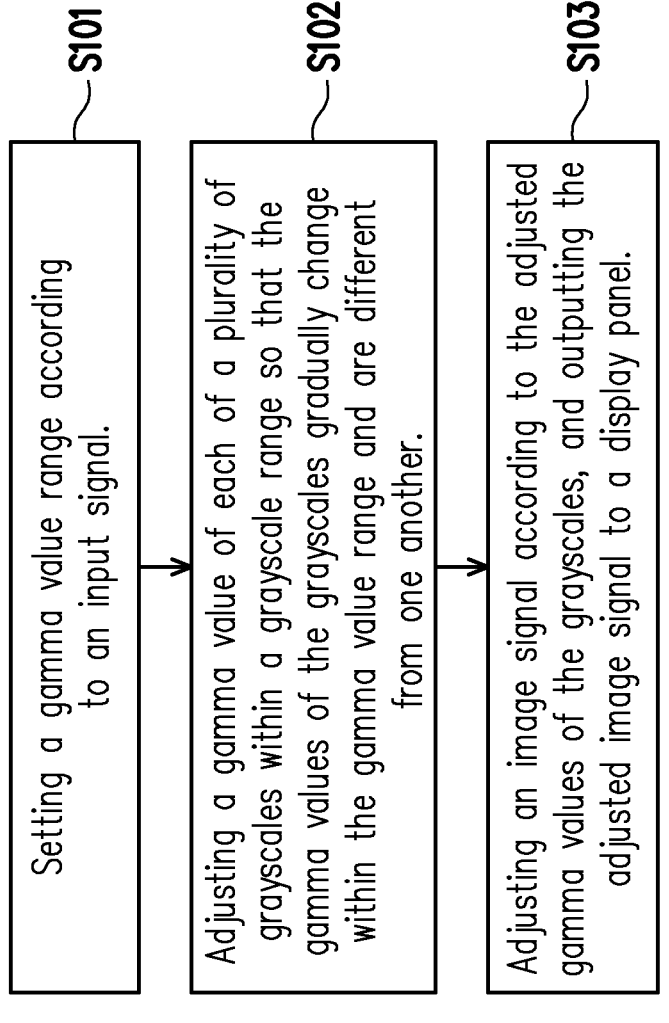
FIG. 2 is a flowchart of a method of adjusting tone of the display in FIG. 1.
Figure 7:
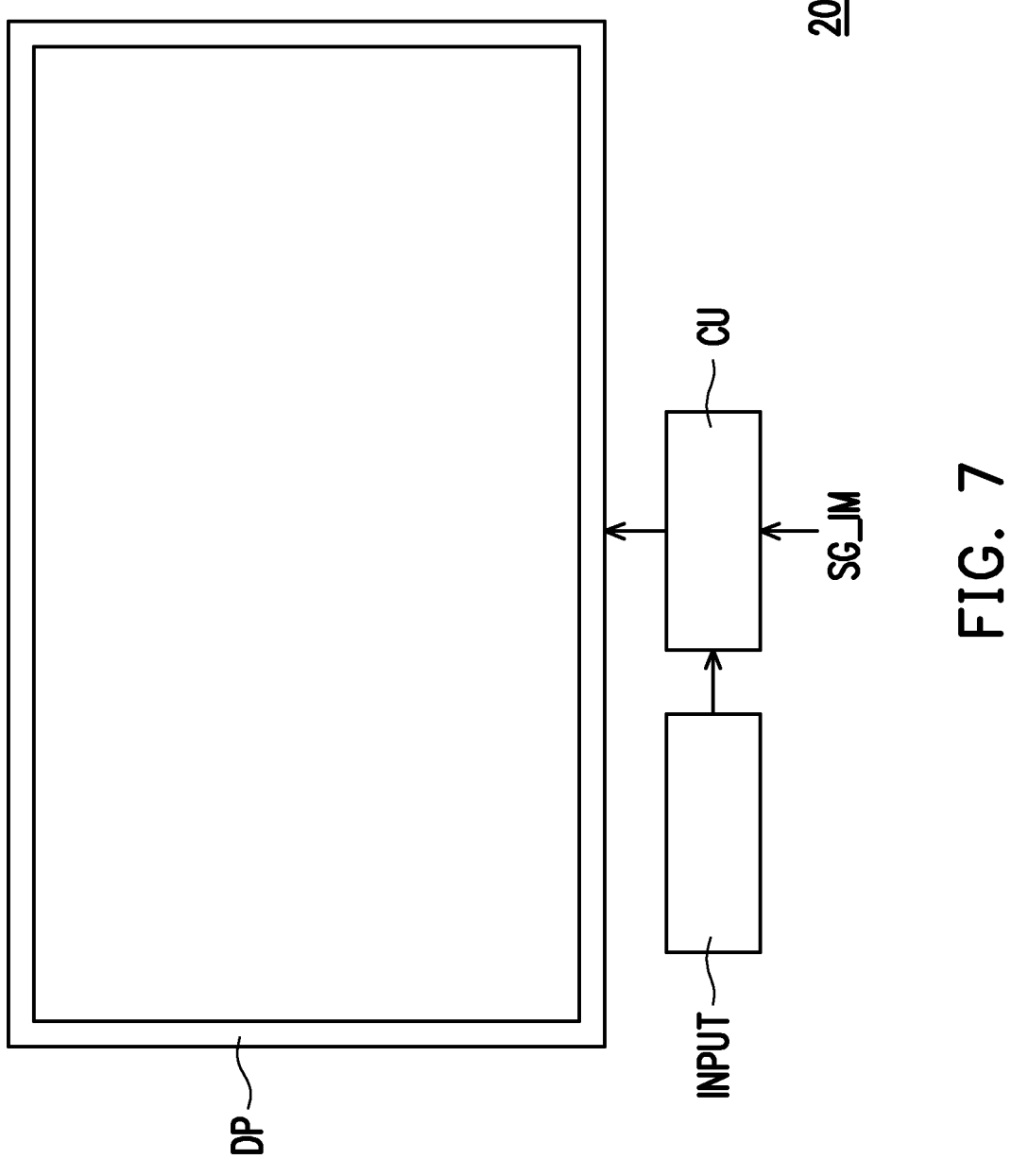
FIG. 7 is a schematic diagram of a display according to another embodiment of the disclosure.

FIG. 1 is a schematic diagram of a display according to an embodiment of the disclosure. FIG. 2 is a flowchart of a method of adjusting tone of the display in FIG. 1. FIG. 7 is a schematic diagram of a display according to another embodiment of the disclosure. Please refer to FIG. 1. A display 10 includes a display panel DP and a control unit CU. The control unit CU is electrically coupled to the display panel DP and is configured to adjust an input image signal SG_IM. The adjusted image signal SG_IM is output to the display panel DP for display. In this embodiment, the display panel DP is, for example, a liquid crystal display panel, but not limited thereto. In other embodiments, the display panel DP may also be another suitable non-emissive or emissive display panel (e.g., a micro light-emitting diode display panel, an organic light-emitting diode display panel, or a mini light-emitting diode display panel).

The method of adjusting tone of the display 10 will be exemplarily described below. Please refer to FIG. 1 and FIG. 2. First, a control unit CU may set a gamma value range according to an input signal. In this embodiment, the control unit CU may be a scaler board and may process data of the input image signal SG_IM through an integrated circuit (IC) chip on the scaler board to generate a new image signal. However, the disclosure is not limited thereto. In another embodiment, the control unit CU may also be a chip and may process an input image signal through an IC chip on the chip to generate a required image signal.

On the other hand, the input signal is, for example, generated by a user through the operation of a user interface UI of the display 10. For example, the user may activate the user interface UI and select a required image processing item to generate the input signal through a plurality of buttons electrically coupled to the scaler board (i.e., the control unit CU) on the display 10, but not limited thereto. In another embodiment, the input signal may also be generated through an input component INPUT (such as a button or a roller) of a display 20 as shown in FIG. 7.

For example, in this embodiment, the image processing items on the user interface UI may include brightness, low grayscale enhancement, low grayscale enhancement range, and high grayscale suppression, but not limited thereto. In other embodiments, the image processing items may also include high grayscale enhancement, high grayscale enhancement range, and low grayscale suppression.

In this embodiment, the user may set a value for each of the image processing items, such as brightness, low grayscale enhancement, low grayscale enhancement range, and high grayscale suppression, to generate the input signal. Once the setting is completed, the control unit CU sets a gamma value range according to the generated input signal (i.e., Step S101). Subsequently, the control unit CU adjusts gamma values of a plurality of grayscales within a grayscale range (for example, grayscale 0 to grayscale 255) respectively according to the input signal so that the gamma values of the grayscales gradually change within the set gamma value range and are different from one another (i.e., Step S102).

It is noted that the adjusted gamma value of each grayscale satisfies the following relational expression 1:

$$g = (g2 - g1) \cdot (nL)^{g3} + g1$$

where g is the adjusted gamma value of each grayscale, g1 is one of the minimum gamma value and the maximum gamma value in the gamma value range, g2 is the other one of the minimum gamma value and the maximum gamma value in the gamma value range, nL is a normalized grayscale of each grayscale and is within a range of 0 to 1, and g3 is within a range of 0.5 to 3. The normalized grayscale nL is, for example, a value of a grayscale level of each grayscale divided by 255.

More specifically, the gamma value range may be defined by g1 and g2, while g3 may determine the rate of change in the gamma values of the grayscales. For example, in this embodiment, g1 may be the minimum gamma value in the gamma value range, g2 may be the maximum gamma value in the gamma value range, and the adjusted gamma value g of each grayscale within the grayscale range increases as the grayscale level of each grayscale rises.

Figure 3C:
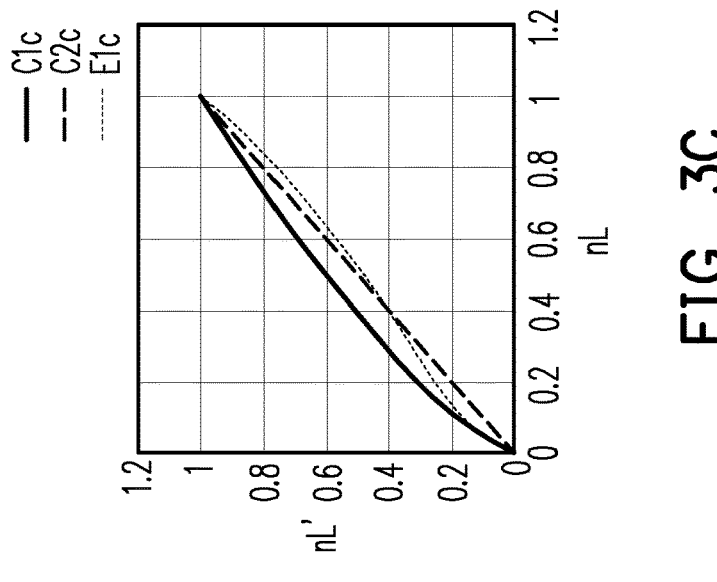
FIG. 3C is a distribution diagram of normalized grayscale of adjusted grayscale against normalized grayscale of original grayscale of the display in FIG. 1 under a parameter condition of a first gamma value.
Figure 3B:
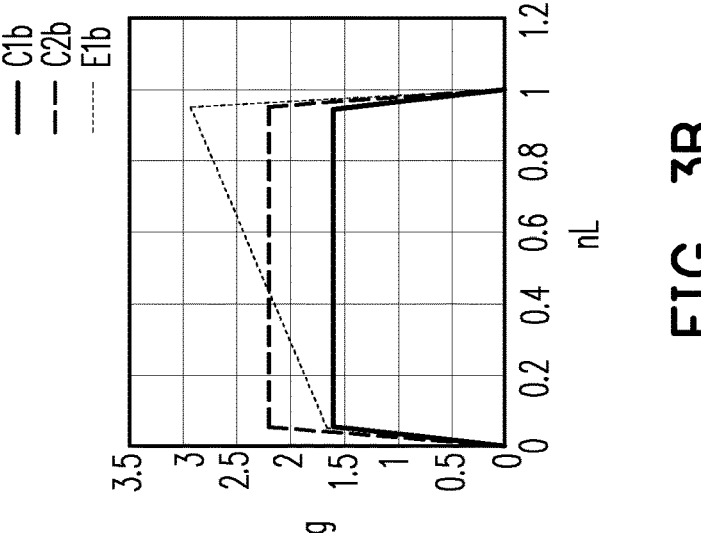
FIG. 3B is a distribution diagram of gamma value against normalized grayscale of the display in FIG. 1 under a parameter condition of a first gamma value.
Figure 3A:
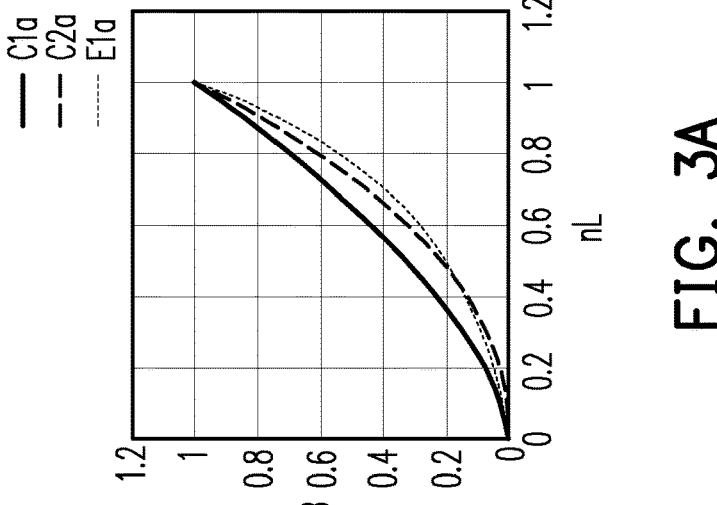
FIG. 3A is a distribution diagram of normalized brightness against normalized grayscale of the display in FIG. 1 under a parameter condition of a first gamma value.

FIG. 3A is a distribution diagram of normalized brightness against normalized grayscale of the display in FIG. 1 under a parameter condition of a first gamma value. FIG. 3B is a distribution diagram of gamma value against normalized grayscale of the display in FIG. 1 under a parameter condition of a first gamma value. FIG. 3C is a distribution diagram of normalized grayscale of adjusted grayscale against normalized grayscale of original grayscale of the display in FIG. 1 under a parameter condition of a first gamma value.

Please refer to FIG. 3B. Curve C1b represents a distribution when all gamma values of normalized grayscales are 1.6 in a first comparative embodiment. Curve C2b represents a distribution when all gamma values of normalized grayscales are 2.2 in a second comparative embodiment. That is, Curves C1b and C2b both show that the gamma value of each grayscale within the grayscale range does not change as the grayscale level of each grayscale rises. Conversely, Curve E1b shows that in this embodiment, when a parameter condition of gamma values (g1, g2, g3) is set to (1.6, 3, 1), the gamma value of each grayscale within the grayscale range increases linearly as the grayscale level of each grayscale rises.

Please refer to FIG. 3A. Curve C1a represents a distribution curve of normalized brightness nB against normalized grayscale nL when the gamma value of each grayscale is 1.6 in the first comparative embodiment. The normalized brightness nB is, for example, a value of brightness of each grayscale divided by brightness of grayscale 255, that is, the normalized brightness nB is within a range of 0 to 1. Curve C2a represents a distribution curve of normalized brightness nB against normalized grayscale nL when the gamma value of each grayscale is 2.2 in the second comparative embodiment.

Notably, Curve Ela represents a distribution curve of normalized brightness nB against normalized grayscale nL when the gamma value of each grayscale gradually changes between 1.6 and 3 in this embodiment. Comparing Curve C1a with Curve C2a in FIG. 3A, it is evident that the brightness of each grayscale in the first comparative embodiment is higher than the brightness of the corresponding grayscale in the second comparative embodiment, where the gamma value of each grayscale is fixed at 2.2. This implies that even though low grayscales are enhanced by adjusting the gamma value of each grayscale from 2.2 to 1.6, high grayscales are also enhanced, leading to a decline in display quality at high grayscales.

However, comparing Curve C2a with Curve Ela in FIG. 3A, it is evident that after adjustment, the brightness of low grayscales (e.g., normalized grayscales nL ranging from 0 to 0.3) in this embodiment are higher than the brightness of low grayscales in the second comparative embodiment, where the gamma value of each grayscale is fixed at 2.2, that is, low grayscale enhancement is achieved. Conversely, after adjustment, the brightness of high grayscales (e.g., normalized grayscales nL ranging from 0.8 to 1) in this embodiment are lower than the brightness of high grayscales in the comparative embodiment, that is, high grayscale suppression is achieved. In other words, the method of adjusting tone of the display 10 in this embodiment can simultaneously improve the display quality of low grayscales and high grayscales.

However, the disclosure is not limited thereto. In another variant embodiment, g1 may be the maximum gamma value in the gamma value range, g2 may be the minimum gamma value in the gamma value range, and the adjusted gamma value of each grayscale within the grayscale range decreases as the grayscale level of each grayscale rises. That is, in this variant embodiment, the control unit CU may process images by suppressing low grayscales and enhancing high grayscales.

Please refer to FIG. 1 and FIG. 3C. From another perspective, the control unit CU also generates a corresponding adjusted grayscale according to the adjusted gamma value g of each grayscale. The adjusted grayscale satisfies the following relational expression 2: nL'=nL (g/2.2) where nL' is a normalized grayscale of the adjusted grayscale and is within a range of 0 to 1. Notably, the g in the relational expression 2 satisfies the relational expression 1.

Curve C1c represents a distribution of normalized grayscale of adjusted grayscale against normalized grayscale of original grayscale in the first comparative embodiment. Curve C2c represents a distribution of normalized grayscale of unadjusted grayscale against normalized grayscale of original grayscale in the second comparative embodiment. Curve E1c represents a distribution of normalized grayscale of adjusted grayscale against normalized grayscale of original grayscale in this embodiment. Comparing Curve C2c with Curve E1c, it is evident that in this embodiment, the grayscale number of adjusted grayscales in an original low grayscale range increases, which can improve the display performance of the display 10 at low grayscales. At the same time, the grayscale number of adjusted grayscales in an original high grayscale range also increases, which can improve the display performance of the display 10 at high grayscales.

Conversely, comparing Curve C1c with Curve C2c, it is evident that in the first comparative embodiment, although the grayscale number of adjusted grayscales in the low grayscale range increases, the grayscale number thereof in the high grayscale range decreases. In other words, compared with the second comparative embodiment, the first comparative embodiment can implement low grayscale enhancement but at the cost of reduced display quality at high grayscales.

Furthermore, after completing the adjustment of the gamma value g of each grayscale within the grayscale range, the control unit CU also adjusts the image signal SG_IM according to the adjusted gamma values g of the grayscales and outputs the adjusted image signal SG_IM to the display panel DP for display (i.e., Step S103). More specifically, the control unit CU may adjust the image signal SG_IM according to the relational expression 2. At this point, the tone adjustment of the display 10 is completed.

Figure 4C:
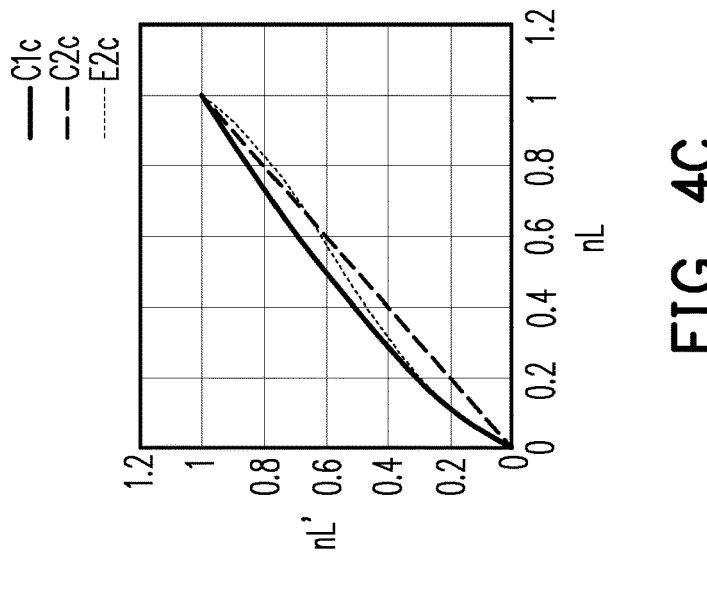
FIG. 4C is a distribution diagram of normalized grayscale of adjusted grayscale against normalized grayscale of original grayscale of the display in FIG. 1 under a parameter condition of a second gamma value.
Figure 4B:
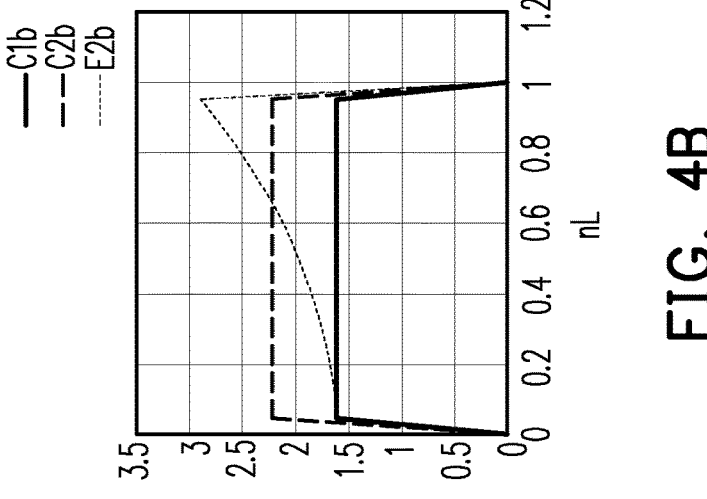
FIG. 4B is a distribution diagram of gamma value against normalized grayscale of the display in FIG. 1 under a parameter condition of a second gamma value.
Figure 4A:
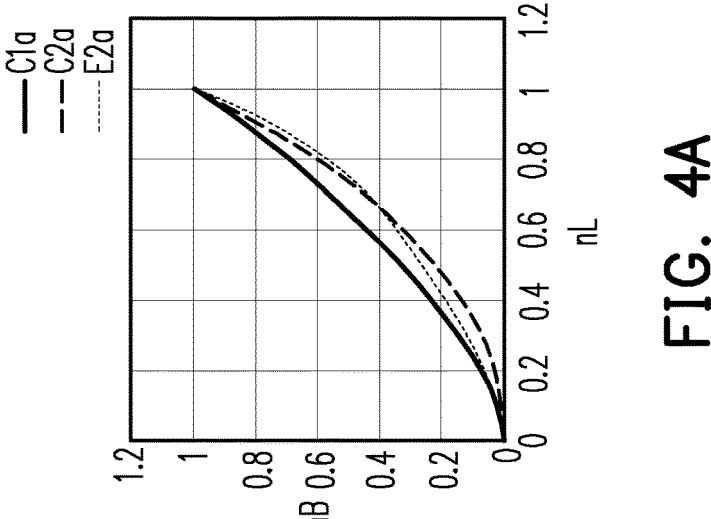
FIG. 4A is a distribution diagram of normalized brightness against normalized grayscale of the display in FIG. 1 under a parameter condition of a second gamma value.

FIG. 4A is a distribution diagram of normalized brightness against normalized grayscale of the display in FIG. 1 under a parameter condition of a second gamma value. FIG. 4B is a distribution diagram of gamma value against normalized grayscale of the display in FIG. 1 under a parameter condition of a second gamma value. FIG. 4C is a distribution diagram of normalized grayscale of adjusted grayscale against normalized grayscale of original grayscale of the display in FIG. 1 under a parameter condition of a second gamma value.

Please refer to FIG. 4B. Curve E2*b* shows that in this embodiment, when the parameter condition of gamma values (g1, g2, g3) is set to (1.6, 3, 2), the gamma value of each grayscale within the grayscale range increases as the grayscale level of each grayscale rises. Notably, comparing Curve E1*b* in FIG. 3B with Curve E2*b* in FIG. 4B, it is evident that when g3 increases from 1 to 2, the rate of change in the gamma values among the grayscales within the grayscale range may be changed. For example, when g3 is 1, the gamma value g increases linearly for the change in the normalized grayscale nL (as shown by Curve E1*b* in FIG. 3B). However, when g3 is 2, the gamma value g increases exponentially for the change in the normalized grayscale nL (as shown by Curve E2*b* in FIG. 4B).

Please refer to FIG. 4A. Curve E2*a* shows a distribution curve of normalized brightness nB against normalized grayscale nL in this embodiment when the parameter condition of gamma values (g1, g2, g3) is set to (1.6, 3, 2). Comparing Curve C2*a* with Curve E2*a*, it is evident that after adjustment, the brightness of low grayscales (e.g., normalized grayscales nL ranging from 0 to 0.3) in this embodiment are higher than the brightness of low grayscales in the second comparative embodiment, where the gamma value of each grayscale is fixed at 2.2, that is, low grayscale enhancement is achieved. Conversely, after adjustment, the brightness of high grayscales (e.g., normalized grayscales nL ranging from 0.8 to 1) in this embodiment are lower than the brightness of high grayscales in the comparative embodiment, that is, high grayscale suppression is achieved. In other words, the method of adjusting tone of the display 10 in this embodiment can simultaneously improve the display quality of low grayscales and high grayscales.

On the other hand, comparing Curve E1a in FIG. 3A with Curve E2*a* in FIG. 4A, it is evident that the enhancement range at low grayscales of Curve E2*a* in FIG. 4A compared to Curve C2*a* in the second comparative embodiment is apparently greater than the enhancement range at low grayscales of Curve E1a in FIG. 3A compared to Curve C2*a* in the second comparative embodiment.

Please refer to FIG. 4C. Curve E2*c* shows a distribution of normalized grayscale of adjusted grayscale against normalized grayscale of original grayscale in this embodiment when the parameter condition of gamma values (g1, g2, g3) is set to (1.6, 3, 2). Comparing Curve E2*c* with Curve C2*c*, it is evident that when g3 is 2, as compared to Curve E1*c* in FIG. 3C (where g3 is 1), the grayscale number of adjusted grayscales in the original low grayscale range may be further increased. That is, the enhancement of the display 10 at low grayscales can be improved.

Notably, under the condition of (g1, g2, g3)=(1.6, 3, 2), although the enhancement at low grayscales can be further improved, the suppression at high grayscales is reduced.

Figure 5C:
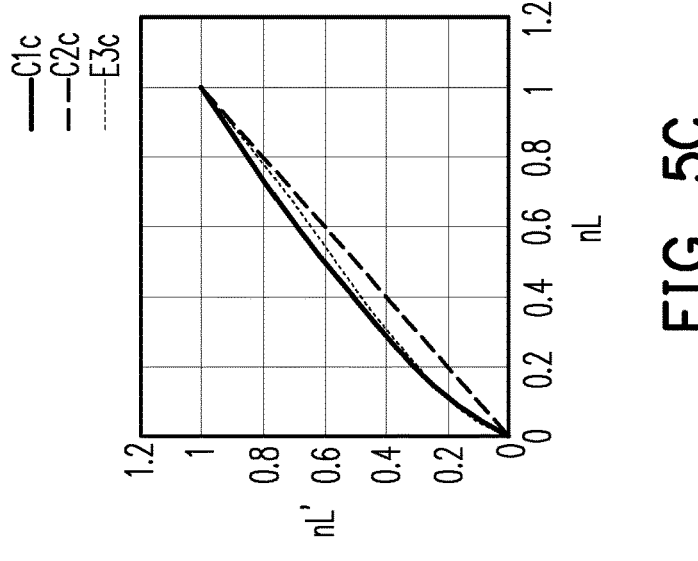
FIG. 5C is a distribution diagram of normalized grayscale of adjusted grayscale against normalized grayscale of original grayscale of the display in FIG. 1 under a parameter condition of a third gamma value.
Figure 5B:
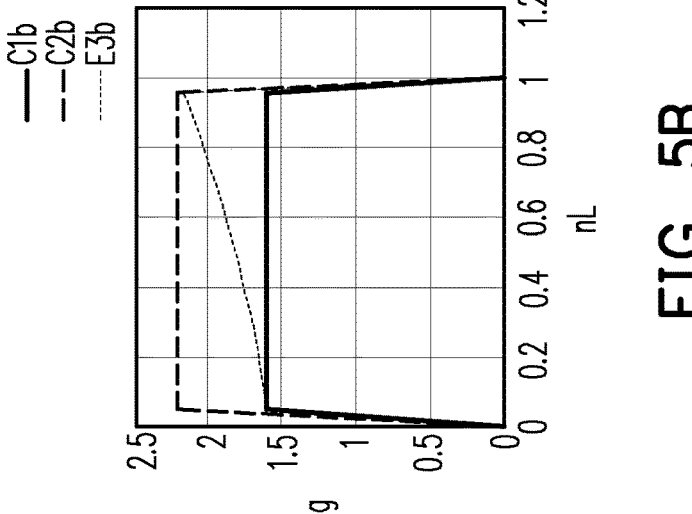
FIG. 5B is a distribution diagram of gamma value against normalized grayscale of the display in FIG. 1 under a parameter condition of a third gamma value.
Figure 5A:
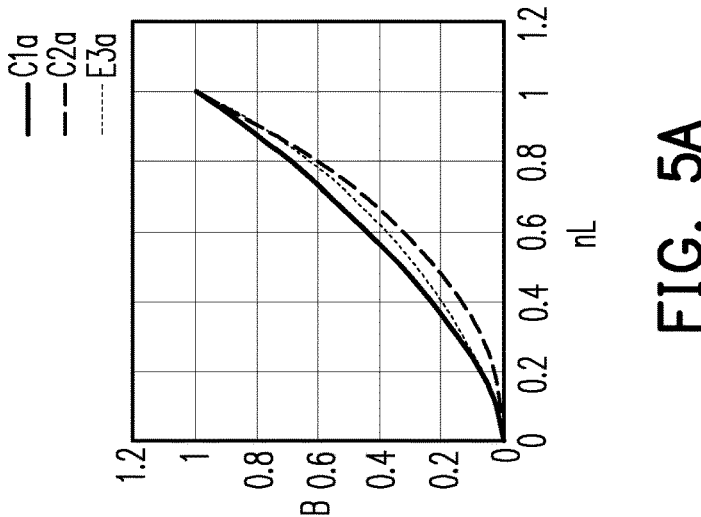
FIG. 5A is a distribution diagram of normalized brightness against normalized grayscale of the display in FIG. 1 under a parameter condition of a third gamma value.

FIG. 5A is a distribution diagram of normalized brightness against normalized grayscale of the display in FIG. 1 under a parameter condition of a third gamma value. FIG. 5B is a distribution diagram of gamma value against normalized grayscale of the display in FIG. 1 under a parameter condition of a third gamma value. FIG. 5C is a distribution diagram of normalized grayscale of adjusted grayscale against normalized grayscale of original grayscale of the display in FIG. 1 under a parameter condition of a third gamma value.

Please refer to FIG. 5B. Curve E3*b* shows that in this embodiment, when the parameter condition of gamma values (g1, g2, g3) is set to (1.6, 2.2, 1.5), the gamma value of each grayscale within the grayscale range increases as the grayscale level of each grayscale rises. Under the condition of (g1, g2, g3)=(1.6, 2.2, 1.5), the gamma value g neither increases linearly (as shown by Curve E1*b* in FIG. 3B) nor exponentially (as shown by Curve E2*b* in FIG. 4B) for the change in the normalized grayscale nL, but shows a nonlinear and slow increase within a gamma value range of 1.5 to 2.2.

Please refer to FIG. 5A. Curve E3*a* shows a distribution curve of normalized brightness nB against normalized grayscale nL in this embodiment when the parameter condition of gamma values (g1, g2, g3) is set to (1.6, 2.2, 1.5). From FIG. 5A, it is evident that the brightness performance represented by Curve E3*a* at low grayscales is close to the brightness performance represented by Curve C1*a* (that is, the gamma value g of each grayscale is 1.6) at low grayscales.

On the other hand, the brightness performance represented by Curve E3*a* at high grayscales is close to the brightness performance represented by Curve C2*a* (that is, the gamma value g of each grayscale is 2.2) at high grayscales.

Please refer to FIG. 5C. Curve E3*c* shows a distribution of normalized grayscale of adjusted grayscale against normalized grayscale of original grayscale in this embodiment when the parameter condition of gamma values (g1, g2, g3) is set to (1.6, 2.2, 1.5). From FIG. 5C, it is evident that the adjusted grayscales represented by Curve E3*c* are close to the adjusted grayscales represented by Curve C1*c* (that is, the gamma value g of each grayscale is 1.6) at low grayscales, while the adjusted grayscales represented by Curve E3*c* at high grayscales are close to the adjusted grayscales represented by Curve C2*c* at high grayscales.

It is noted that the various aforementioned parameter conditions of gamma values can all allow the display 10 to have corresponding tastes in images under different display applications, with no superiority or inferiority. According to the above descriptions, it is evident that the method of adjusting tone of the display 10 of the disclosure may generate a variety of gamma value curves (such as Curve E1a in FIG. 3A, Curve E2*a* in FIG. 4A, and Curve E3*a* in FIG. 5A) through the adjustment of g1, g2, and g3 to satisfy diverse requirements of tastes in images. In addition, these adjustments are suitable for a user end of the display 10 to perform, which provide the user with more convenience.

Furthermore, in this embodiment, the display 10 is suitable for displaying a first color, a second color, and a third color different from one another. These colors, for example, are red, green, and blue respectively, but not limited thereto. In consideration of the color temperature performance of a lighting source (such as backlight or ambient light), display grayscales of different colors may be adjusted respectively with the method of adjusting tone to obtain the required color display quality.

For example, setting a gamma value range (i.e., Step S101 in FIG. 2) may include setting a first gamma value range of the gamma value range according to the maximum brightness of the first color, setting a second gamma value range of the gamma value range according to the maximum brightness of the second color, and setting a third gamma value range of the gamma value range according to the maximum brightness of the third color, wherein the first gamma value range, the second gamma value range, and the third gamma value range may be different. The maximum brightness of each color is, for example, the display brightness of the color at grayscale 255.

It is noted that when the maximum brightness of the first color is greater than the maximum brightness of the second color, the maximum gamma value of the first gamma value range may be greater than the maximum gamma value of the second gamma value range in order to compensate for the difference in the maximum brightness between the two colors.

For example, when the color temperature of a lighting source is 5500K, a red grayscale, a green grayscale, and a blue grayscale corresponding to the color temperature representation of the display 10 thereof in an sRGB color space are 255, 236, and 224 respectively. In other words, the maximum brightness of green is lower than the maximum brightness of red, and the maximum brightness of blue is lower than the maximum brightness of green.

Figures 6A, 6B, 6C:
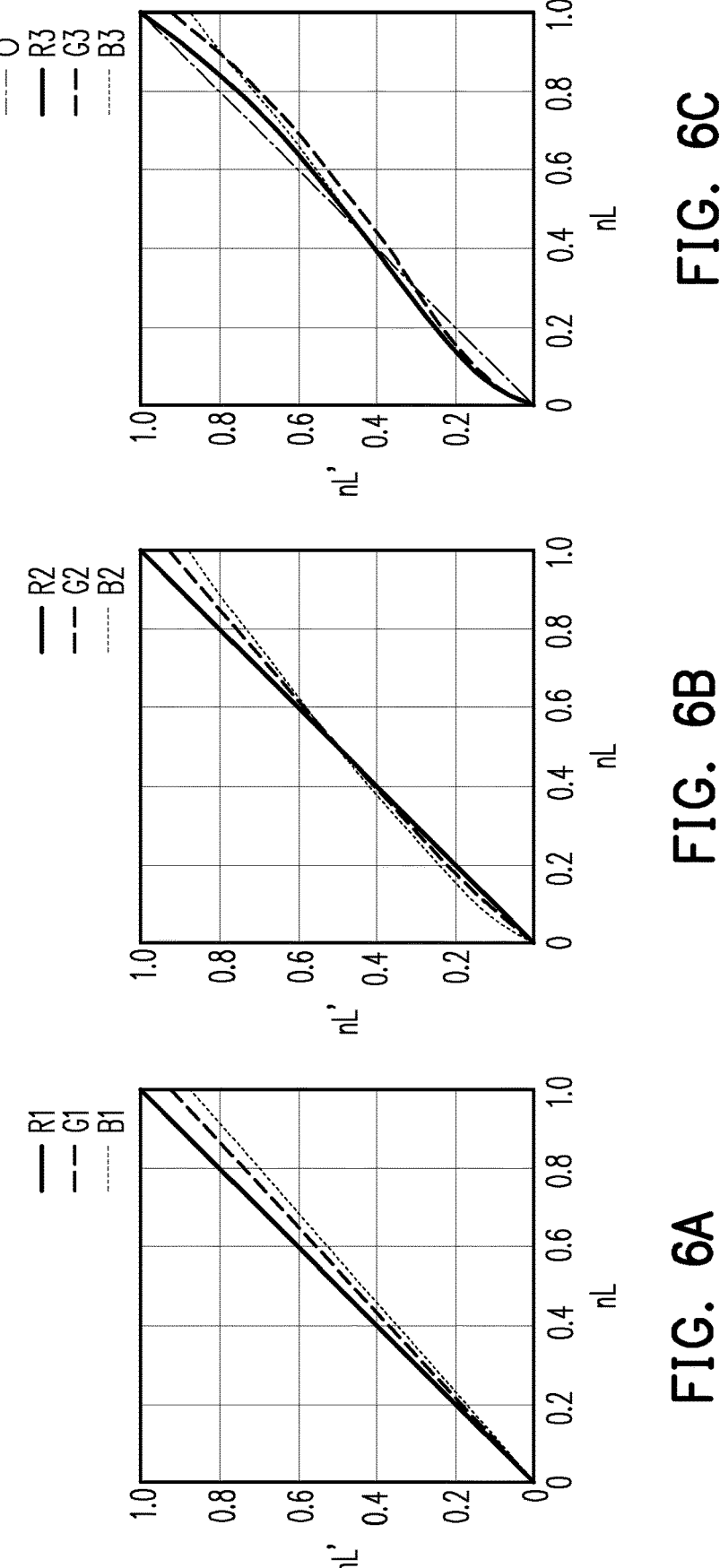
FIG. 6A is a distribution diagram of normalized grayscale of adjusted grayscale against normalized grayscale of original grayscale of three display colors of the display in FIG. 1 under a parameter condition of the same gamma value.
FIG. 6B is a distribution diagram of normalized grayscale of adjusted grayscale against normalized grayscale of original grayscale of the three display colors of the display in FIG. 1 under a first set of parameter conditions of gamma values.
FIG. 6C is a distribution diagram of normalized grayscale of adjusted grayscale against normalized grayscale of original grayscale of the three display colors of the display in FIG. 1 under a second set of parameter conditions of gamma values.

FIG. 6A is a distribution diagram of normalized grayscale of adjusted grayscale against normalized grayscale of original grayscale of three display colors of a display in FIG. 1 under a parameter condition of a same gamma value. Please refer to FIG. 6A. Curve R1, Curve G1, and Curve B1 represent a distribution of normalized grayscale of adjusted red grayscale against normalized grayscale of original red grayscale, a distribution of normalized grayscale of adjusted green grayscale against normalized grayscale of original green grayscale, and a distribution of normalized grayscale of adjusted blue grayscale against normalized grayscale of original blue grayscale respectively when the color temperature of a lighting source of the display 10 is 5500K and the parameter condition of gamma values is (g1, g2, g3)=(2.2, 2.2, 1), (i.e., the gamma value of each grayscale of every color is maintained at 2.2). Here, the normalized grayscale is, for example, a value of the grayscale level of each grayscale of each color divided by 255. As can be seen in the drawings, when the color temperature of the lighting source is 5500K, the adjusted grayscales of green and blue respectively at each grayscale are lower than the adjusted grayscale of red at the corresponding grayscale.

To enhance the maximum brightness of green and blue, gamma values of green grayscales and blue grayscales may be adjusted. FIG. 6B is a distribution diagram of normalized grayscale of adjusted grayscale against normalized grayscale of original grayscale of the three display colors of the display in FIG. 1 under a first set of parameter conditions of gamma values. The first set of parameter conditions of gamma values includes a parameter condition of gamma values (g1, g2, g3)=(2.2, 2.2, 1.0) for red, a parameter condition of gamma values (g1, g2, g3)=(2.0, 2.0, 1.0) for green, and a parameter condition of gamma values (g1, g2, g3)=(1.8, 1.8, 1.0) for blue. That is, in the first set of parameter conditions of gamma values, each color has the same gamma value at different grayscales.

Please refer to FIG. 6B. Curve R2 represents a distribution of normalized grayscale of adjusted grayscale against normalized grayscale of original grayscale for red under the parameter condition of gamma values (g1, g2, g3)=(2.2, 2.2, 1.0). Curve G2 represents a distribution of normalized grayscale of adjusted grayscale against normalized grayscale of original grayscale for green under the parameter condition of gamma values (g1, g2, g3)=(2.0, 2.0, 1.0). Curve B2 represents a distribution of normalized grayscale of adjusted grayscale against normalized grayscale of original grayscale for blue under the parameter condition of gamma values (g1, g2, g3)=(1.8, 1.8, 1.0). From FIG. 6B, it is evident that by reducing the gamma values g of green and blue respectively at each grayscale, color cast can be significantly reduced. However, such tone adjustment cannot obtain low grayscale enhancement and high grayscale suppression.

FIG. 6C is a distribution diagram of normalized grayscale of adjusted grayscale against normalized grayscale of original grayscale of the three display colors of the display in FIG. 1 under a second set of parameter conditions of gamma values. The second set of parameter conditions of gamma values includes a parameter condition of gamma values (g1, g2, g3)=(1.6, 3.0, 1.0) for red, a parameter condition of gamma values (g1, g2, g3)=(1.6, 3.0, 1.0) for green, and a parameter condition of gamma values (g1, g2, g3)=(1.6, 2.2, 1.0) for blue. In other words, in the second set of parameter conditions of gamma values, the gamma value of each grayscale within the grayscale range for red increases linearly from 1.6 to 3.0 as the grayscale level rises, the gamma value of each grayscale within the grayscale range for green increases linearly from 1.6 to 3.0 as the grayscale level rises, and the gamma value of each grayscale within the grayscale range for blue increases linearly from 1.6 to 2.2 as the grayscale level rises.

Please refer to FIG. 6C. Curve R3 represents a distribution of normalized grayscale of adjusted grayscale against normalized grayscale of original grayscale for red under the parameter condition of gamma values (g1, g2, g3)=(1.6, 3.0, 1.0). Curve G3 represents a distribution of normalized grayscale of adjusted grayscale against normalized grayscale of original grayscale for green under the parameter condition of gamma values (g1, g2, g3)=(1.6, 3.0, 1.0). Curve B3 represents a distribution of normalized grayscale of adjusted grayscale against normalized grayscale of original grayscale for blue under the parameter condition of gamma values (g1, g2, g3)=(1.6, 2.2, 1.0). Curve O represents a distribution of normalized grayscale of adjusted grayscale against normalized grayscale of original grayscale under the parameter condition of gamma values (g1, g2, g3)=(2.2, 2.2, 1.0). According to the drawings, by adjusting the respective parameter conditions of gamma values for red, green, and blue respectively, not only can color cast be reduced, low grayscale enhancement and high grayscale suppression can be further generated, thereby satisfying the required image quality requirements.

In summary, in the display and the method of adjusting tone thereof according to the embodiments of the disclosure, the control unit is suitable for adjusting the gamma values of the grayscales within the grayscale range respectively so that the grayscales have the gamma values that gradually change and are different from one another within the set gamma value range. By adjusting the image signal to be output to the display panel according to the distribution of the adjusted gamma values of the grayscales, brightness enhancement or suppression of low grayscales or high grayscales can be implemented, thereby satisfying the adjustment requirements of different tastes in images.

What is claimed is:

1. A method of adjusting tone of a display, comprising:
setting a gamma value range according to an input signal;
adjusting a plurality of gamma values of a plurality of grayscales within a grayscale range respectively so that the gamma values of the grayscales gradually change within the gamma value range and are different from one another; and
adjusting an image signal according to the adjusted gamma values of the grayscales and outputting the adjusted image signal to a display panel, wherein the adjusted gamma values of the grayscales increase or decrease as a grayscale level of each of the grayscales rises, the adjusted gamma value of each of the grayscales satisfies a relational expression as follows:
$g=(g2-g1)\cdot(nL)^{g3}+g1$, where g is the adjusted gamma value of each of the grayscales, g1 is one of a minimum gamma value and a maximum gamma value of the gamma value range, g2 is other one of the minimum gamma value and the maximum gamma value of the gamma value range, nL is a normalized grayscale of each of the grayscales and is within a range of 0 to 1, and g3 is within a range of 0.5 to 3.

2. The method of adjusting tone of the display of claim 1, further comprising:
generating a corresponding adjusted grayscale according to the adjusted gamma value of each of the grayscales, wherein the adjusted grayscale satisfies a relational expression as follows: $nL'=nL^{(g/2.2)}$, where nL' is a normalized grayscale of the adjusted grayscale and is within a range of 0 to 1.

3. The method of adjusting tone of the display of claim 1, wherein the display is suitable for displaying a first color and a second color different from each other, a maximum brightness of the first color is different from a maximum brightness of the second color, and setting the gamma value range comprises:
setting a first gamma value range of the gamma value range according to the maximum brightness of the first color, and
setting a second gamma value range of the gamma value range according to the maximum brightness of the second color, wherein the first gamma value range is different from the second gamma value range, the maximum brightness of the first color is greater than the maximum brightness of the second color, and a maximum gamma value of the first gamma value range is greater than a maximum gamma value of the second gamma value range.

4. The method of adjusting tone of the display of claim 1, wherein the input signal is generated by operating a user interface or an input component of the display.

5. A display, comprising:
a display panel, suitable for displaying according to an image signal; and
a control unit, electrically coupled to the display panel and configured to:
set a gamma value range according to an input signal;
adjust a plurality of gamma values of a plurality of grayscales within a grayscale range respectively so that the gamma values of the grayscales gradually change within the gamma value range and are different from one another; and
adjust the image signal according to the adjusted gamma values of the grayscales and output the adjusted image signal to the display panel, wherein the adjusted gamma values of the grayscales increase or decrease as a grayscale level of each of the grayscales rises, the adjusted gamma value of each of the grayscales satisfies a relational expression as follows:
$g=(g2-g1)\cdot(nL)^{g3}+g1$, where g is the adjusted gamma value of each of the grayscales, g1 is one of a minimum gamma value and a maximum gamma value of the gamma value range, g2 is other one of the minimum gamma value and the maximum gamma value of the gamma value range, nL is a normalized grayscale of each of the grayscales and is within a range of 0 to 1, and g3 is within a range of 0.5 to 3.

6. The display of claim 5, wherein the control unit is further configured to:
generate a corresponding adjusted grayscale according to the adjusted gamma value of each of the grayscales, wherein the adjusted grayscale satisfies a relational expression as follows: $nL'=nL^{(g/2.2)}$, where nL' is a normalized grayscale of the adjusted grayscale and is within a range of 0 to 1.

7. The display of claim 5, suitable for displaying a first color and a second color different from each other, wherein a maximum brightness of the first color is different from a maximum brightness of the second color, and setting the gamma value range comprises:
setting a first gamma value range of the gamma value range according to the maximum brightness of the first color, and
setting a second gamma value range of the gamma value range according to the maximum brightness of the second color, wherein the first gamma value range is different from the second gamma value range, the maximum brightness of the first color is greater than the maximum brightness of the second color, and a maximum gamma value of the first gamma value range is greater than a maximum gamma value of the second gamma value range.

8. The display of claim 5, wherein the input signal is generated by operating a user interface or an input component of the display.

* * * * *